Patented Aug. 23, 1949

2,480,081

UNITED STATES PATENT OFFICE 2,480,081

PERHALOCYCLOHEXANES

Vincent V. Lindgren, West Lafayette, and Earl T. McBee, La Fayette, Ind., assignors to Purdue Research Foundation, West Lafayette, Ind., a corporation of Indiana No Drawing. Application June 7, 1946, Serial No. 675,291

4 Claims. (Cl. 260—648)

This invention relates to organic compounds designated as the perhalocyclohexanes and more specifically to the fluorine-containing perhalocyclohexanes having from one to five halogen atoms other than fluorine in the molecule.

The compounds in general are very stable, heat-resistant organic compositions, the lowest member of the series, i. e., the compound containing one chlorine atom, boiling at about 77 degrees centigrade, and other members boiling at higher temperatures depending upon the number of halogen atoms other than fluorine therein. The presence of only carbon and halogen atoms in the molecule greatly enhances the stability of these compounds, and due to their stability and their heat-resistant qualities, the compounds are useful as dielectrics, heat-transfer media, insulating liquids, transformer fluids and so forth. Some of these compounds also exhibit lubricating properties.

The compounds may be prepared, for example, by reacting an appropriate bromo- or chloro-substituted benzene with manganese trifluoride or other suitable halogenating agent maintained in a finely granulated form at high temperatures. The bromo- or chloro-substituted benzene may be vaporized into a series of manganese trifluoride reactors, maintained at a suitable temperature, e. g., 55 to 450 degrees centigrade. The manganese trifluoride reactors may be constructed of a low-carbon sheet steel and may be five feet long, six inches wide and one inch deep. Each reactor may be equipped with its own individual heating unit, to allow the maintenance of temperature at any desired level. The unit may be equipped with suitable inlets, outlets, and thermometer wells, and may be insulated with magnesia covering. Each unit may contain approximately 20 moles of manganese trifluoride. It may be found advantageous, if a series of such units is used, to maintain the reactors at successively higher temperatures, i. e., to maintain the first reactor slightly above the boiling point of the starting material, the remaining reactors in the series being maintained at a temperature slightly above that of the preceding unit in the series. In this manner the bromo- or chlorobenzene is subjected to the reaction with manganese trifluoride first at the low temperature, and the partially fluorinated product from the reaction at this low temperature is then reacted with additional manganese trifluoride at successively higher temperatures. This is advantageous in view of the fact that the additional fluorine in the cyclic nucleus makes the compound more heat-resistant and less decomposition occurs, resulting in higher yields of fluorinated product. It may also be found advantageous to maintain the reactors during the first contact with the bromo- or chlorobenzene at a relatively low temperature, and then to recycle the partially fluorinated product from the first reaction at an increased temperature, increasing the amount of fluorine in the molecule with each passage of the organic material through the reactor. The organic product may then be condensed in iced receivers, washed with dilute alkali or water and rectified.

The following examples indicate methods by which members of the new group of compounds may be prepared, but are in no way to be construed as limiting the invention thereto:

Example 1

One hundred and forty-seven grams of orthodichlorobenzene was placed in a nickel vaporizer, heated to its vaporizing temperature, and nitrogen vapors passed therethrough. The orthodichlorobenzene was carried by the nitrogen into a series of reaction units containing approximately 50 gram moles of silver difluoride. Six reaction units were utilized in the operation, the temperature of each reactor being slightly higher than that of the preceding unit. The units were thus maintained at 118, 123, 150, 165, 190 and 200 degrees centigrade, while orthodichlorobenzene was introduced. After all of the organic material had been introduced into the reactor, the passage of nitrogen through the apparatus was continued for several hours in order to expel all of the product from the reactor. A recovery of 194 grams of liquid was made from the first run.

The temperature of the reactor was then raised, and the product from the preceding run was recycled, the individual units in the reactor being maintained at 142, 166, 226, 250, 285, and 323 degrees centigrade. Nitrogen was used to purge the reactor as in the previous run, and a batch of colorless organic liquid weighing 149 grams was recovered.

An additional 147 grams of orthodichlorobenzene was treated with silver difluoride in the reactor. The units of the reactor in this case were maintained at 123, 135, 159, 178, 195 and 227 degrees centigrade. The purpose of this reaction was to obtain more starting material for a final recycle. The organic product weighed 244 grams.

The product from the previous reaction was recycled with the various units maintained at 196, 230, 275, 295, 315 and 325 degrees centigrade. Approximately 200 grams of a colorless organic liquid was obtained from the recycle.

The products from the two recycling operations were combined and once more recycled in the reactor the units being maintained at 288, 296, 297, 323 and 335 degrees centigrade during the run in order to ensure satisfactory fluorination. Nitrogen was again used to purge the reactor after all of the organic material had been introduced. When the product from this run was poured over ice, the organic layer which separated weighed 246 grams. The organic product was distilled to remove the greater portion of low-boiling material. Rectification of the residue yielded 50 grams, boiling from 75 to 80 degrees centigrade and 15 grams boiling at 110 degrees centigrade. The remainder of the product separated from the rectification consisted of lower, intermediate, and higher fractions. The lower cut consisted of chloroundecafluorocyclohexane and the second cut consisted of dichlorodecafluorocyclohexane.

*Example 2*

A reactor comprising two iron units, each containing approximately 20 moles of manganese trifluoride was set up with suitable heating units. Two hundred and ninety-two grams of orthodichlorobenzene was introduced into this reactor from a dropping funnel during ninety minutes. The reactor was maintained at about 230 degrees centigrade. The reactor was purged with nitrogen for two hours and 345 grams of partially fluorinated material isolated. The reactor was regenerated with fluorine and the temperature then raised to about 400 degrees centigrade. The reactor was purged with nitrogen for two hours and 345 grams of partially fluorinated material isolated. The reactor was regenerated with fluorine and the temperature then raised to about 400 degrees centigrade. The material from the first pass was recycled through the reactor at this temperature during two hours. After purging with nitrogen, 410 grams of product was obtained. This fluorinated product was recycled again at a temperature of about 450 degrees centigrade in order to ensure the desired degree of fluorination. The product weighed 408 grams. From this mixture of halogenated compounds was separated by rectification two fractions as follows: (1) 96.2 grams of chloroundecafluorocyclohexane, (2) 114.8 grams of dichlorodecafluorocyclohexane. The analyses and physical properties of these two compounds are listed in the table below.

| Compound | B. P., °C. | F. P., °C. | N. D., 20°C. | d, 25°C. | Per Cent F Found | Per Cent F Calculated | Per Cent Cl Found | Per Cent Cl Calculated | M. W. Found | M. W. Calculated |
|---|---|---|---|---|---|---|---|---|---|---|
| $C_6ClF_{11}$ | 76.9–77.0 | 24–26 |  |  | 67.2 | 66.0 | 10.9 | 11.2 | 314 | 316.5 |
| $C_6Cl_2F_{10}$ | 107.5–107.7 | 12–14 | 1.3413 | 1.79 | 57.1 | 57.1 | 21.2 | 21.3 | 328 | 333.0 |

*Example 3*

A single unit iron reactor containing 20 moles of lead tetrafluoride was assembled as usual and equipped with an iron vaporizing chamber. One-half mole of hexachlorobenzene, 142 grams, was placed in the vaporizer and the vaporizer and reactor heated to about 300 degrees centigrade. By passing nitrogen through the vaporizer, the hexachlorobenzene was vaporized into the reactor where fluorination occurred. After six hours of this procedure, 85 grams of fluorinated product was obtained. From the mixture was separated 15 grams of trichlorononafluorocyclohexane containing 49.2 per cent fluorine and 31.0 per cent chlorine. The compound boils at about 144–148 degrees centigrade. The theoretical halogen content for the compound is 49.0 per cent fluorine and 30.5 per cent chlorine.

Other members of this group of compounds which may be prepared as previously described include bromoundecafluorocyclohexane, dibromodecafluorocyclohexane, tribromononafluorocyclohexane, tetrachlorooctafluorocyclohexane, tetrabromooctafluorocyclohexane and pentachloroheptafluorocyclohexane. These compounds may be obtained by using as starting material a bromo- or chloro- substituted benzene which contains at least the same number of bromine or chlorine atoms as the desired bromo- or chlorofluorocyclohexane.

We claim:

1. A perhalocyclohexane containing chlorine and fluorine as the only halogens, wherein —$CF_2$— groups are present in the ring, and wherein the number of chlorine atoms is from one to three, inclusive.
2. Chloroundecafluorocyclohexane.
3. Dichlorodecafluorocyclohexane.
4. Trichlorononafluorocyclohexane.

VINCENT V. LINDGREN.
EARL T. McBEE.

REFERENCES CITED

The following references are of record in the file of this patent:

UNITED STATES PATENTS

| Number | Name | Date |
|---|---|---|
| 2,404,374 | Harmon | July 23, 1946 |

OTHER REFERENCES

Bigelow et al. "J. A. C. S.", 56, 2773–4 (1934).
Simons et al. "J. A. C. S.", 61, 2962–66 (1939).
Fukuhara et al. "J. A. C. S.", 63, 2792–5 (1941).
Henne et al. "J. A. C. S.", 67, 1235–7 (1945).